US012579022B2

(12) United States Patent
Dahiya et al.

(10) Patent No.: US 12,579,022 B2
(45) Date of Patent: Mar. 17, 2026

(54) SYSTEM AND METHOD FOR GENERATING A CUSTOMIZED RECOVERY PLAN FOR A PROCESSING ERROR IN A COMPUTING SYSTEM

(71) Applicant: Bank of America Corporation, Charlotte, NC (US)

(72) Inventors: Nisha Dahiya, Majlis Park (IN); Neelkamal Chillagani, Snoqualmie, WA (US); Vamsi Mohan Rao Venepalle, Plainsboro, NJ (US)

(73) Assignee: Bank of America Corporation, Charlotte, NC (US)

( * ) Notice: Subject to any disclaimer, the term of this patent is extended or adjusted under 35 U.S.C. 154(b) by 10 days.

(21) Appl. No.: 18/665,526

(22) Filed: May 15, 2024

(65) Prior Publication Data

US 2025/0355755 A1 Nov. 20, 2025

(51) Int. Cl.
*G06F 11/07* (2006.01)
(52) U.S. Cl.
CPC ...... *G06F 11/0793* (2013.01); *G06F 11/0709* (2013.01)
(58) Field of Classification Search
CPC ............. G06F 11/0706; G06F 11/0709; G06F 11/079; G06F 11/0793; G06F 11/008
See application file for complete search history.

(56) References Cited

U.S. PATENT DOCUMENTS

| | | | |
|---|---|---|---|
| 8,880,930 | B2 | 11/2014 | Ahmad et al. |
| 9,069,737 | B1 * | 6/2015 | Kimotho ............... G06F 11/079 |
| 9,558,070 | B2 | 1/2017 | Nelson et al. |
| 9,563,478 | B1 | 2/2017 | Miller et al. |
| 9,946,593 | B2 | 4/2018 | Bishop et al. |
| 10,007,542 | B2 | 6/2018 | Hegdal et al. |
| 10,120,770 | B2 | 11/2018 | Gondi et al. |

(Continued)

FOREIGN PATENT DOCUMENTS

CN 104407847 B 5/2019

OTHER PUBLICATIONS

Nisha Dahiya, A system and method for resolving processing errors in a computing system, U.S. Appl. No. 18/665,508, filed May 15, 2024, pp. 1-54.

(Continued)

*Primary Examiner* — Joseph R Kudirka

(57) ABSTRACT

In response to determining that a first error message associated with a first software application is not a known error message associated with the first software application, a jobs manager determines a second software application of a plurality of software applications that is associated with a same or similar known error message as the first error message and obtains a first known recovery plan associated with the same or similar known error message. The jobs manager then generates a customized recovery plan for the first software application based at least in part upon the first known recovery plan, wherein the customized recovery plan comprises one or more customized recovery steps associated with resolving the first error. The jobs manager performs one or more of the customized recovery steps associated with the customized recovery plan to resolve the first error associated with the first software application.

20 Claims, 4 Drawing Sheets

(56) References Cited

U.S. PATENT DOCUMENTS

| | | | |
|---|---|---|---|
| 10,540,197 B2 | 1/2020 | Ahmad et al. | |
| 10,616,313 B2 | 4/2020 | Wang et al. | |
| 10,628,267 B2 | 4/2020 | Pradhan et al. | |
| 10,853,121 B2 | 12/2020 | Antony et al. | |
| 11,099,928 B1 * | 8/2021 | Vah ...................... | G06N 3/044 |
| 11,100,064 B2 | 8/2021 | Dwarampudi et al. | |
| 11,226,847 B2 | 1/2022 | Alluboyina et al. | |
| 11,544,155 B2 | 1/2023 | Ashraf et al. | |
| 11,669,414 B2 | 6/2023 | Bhagi et al. | |
| 11,734,127 B2 | 8/2023 | Dwarampudi et al. | |
| 11,799,956 B2 | 10/2023 | Pradhan et al. | |
| 12,265,452 B2 * | 4/2025 | Kuppuswamy ..... | G06F 11/1415 |
| 2020/0050473 A1 | 2/2020 | Joffe | |
| 2021/0208977 A1 | 7/2021 | Nara et al. | |
| 2022/0035559 A1 | 2/2022 | Nara et al. | |
| 2024/0095114 A1 * | 3/2024 | Najumudeen ....... | G06F 11/0793 |

OTHER PUBLICATIONS

Nisha Dahiya, A system and method for predicting processing errors in a computing system, U.S. Appl. No. 18/665,544, filed May 15, 2024, pp. 1-54.

* cited by examiner

200

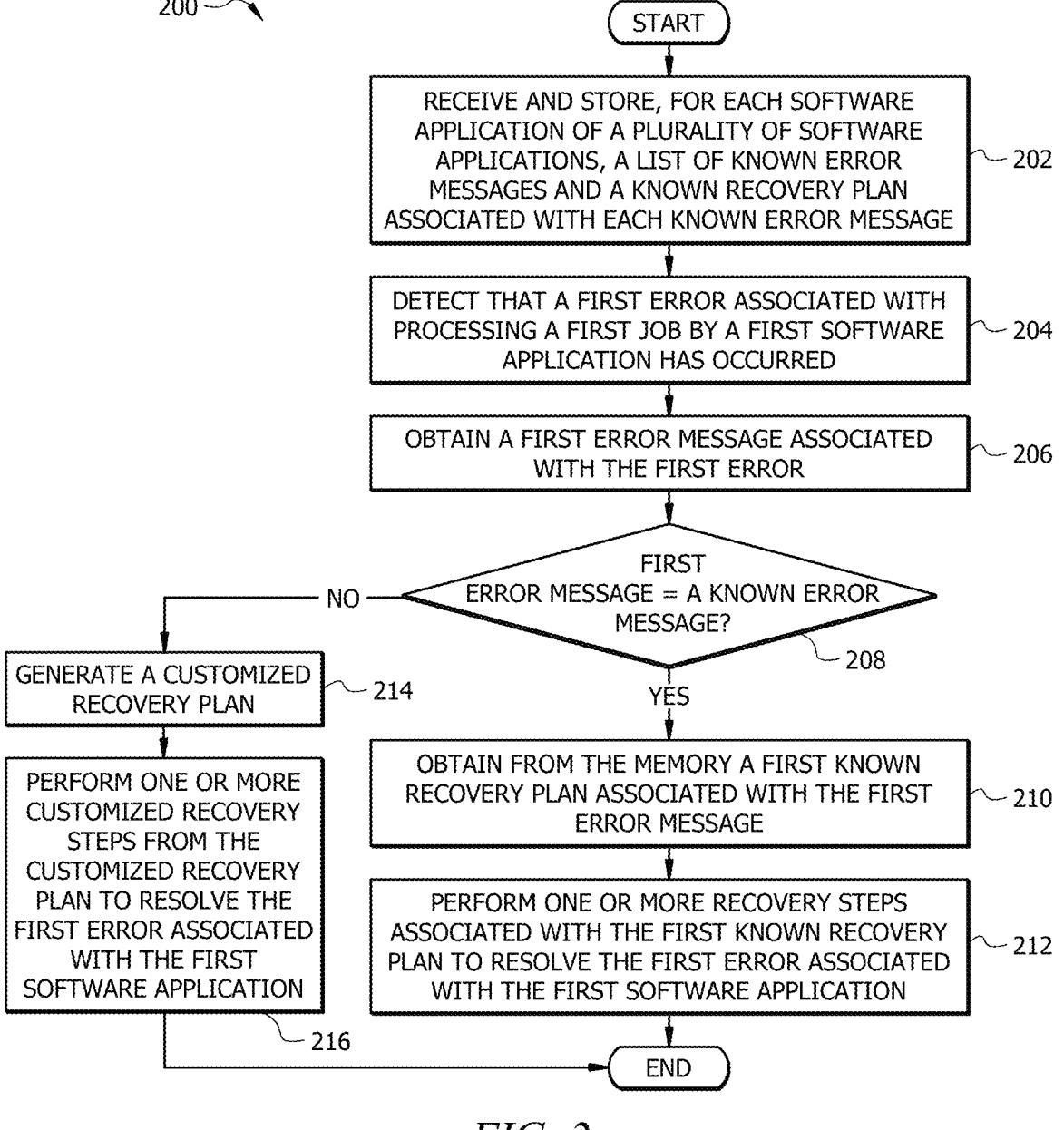

START

RECEIVE AND STORE, FOR EACH SOFTWARE APPLICATION OF A PLURALITY OF SOFTWARE APPLICATIONS, A LIST OF KNOWN ERROR MESSAGES AND A KNOWN RECOVERY PLAN ASSOCIATED WITH EACH KNOWN ERROR MESSAGE — 202

DETECT THAT A FIRST ERROR ASSOCIATED WITH PROCESSING A FIRST JOB BY A FIRST SOFTWARE APPLICATION HAS OCCURRED — 204

OBTAIN A FIRST ERROR MESSAGE ASSOCIATED WITH THE FIRST ERROR — 206

FIRST ERROR MESSAGE = A KNOWN ERROR MESSAGE? — 208

NO

GENERATE A CUSTOMIZED RECOVERY PLAN — 214

PERFORM ONE OR MORE CUSTOMIZED RECOVERY STEPS FROM THE CUSTOMIZED RECOVERY PLAN TO RESOLVE THE FIRST ERROR ASSOCIATED WITH THE FIRST SOFTWARE APPLICATION

— 216

YES

OBTAIN FROM THE MEMORY A FIRST KNOWN RECOVERY PLAN ASSOCIATED WITH THE FIRST ERROR MESSAGE — 210

PERFORM ONE OR MORE RECOVERY STEPS ASSOCIATED WITH THE FIRST KNOWN RECOVERY PLAN TO RESOLVE THE FIRST ERROR ASSOCIATED WITH THE FIRST SOFTWARE APPLICATION — 212

END

FIG. 2

SYSTEM AND METHOD FOR GENERATING A CUSTOMIZED RECOVERY PLAN FOR A PROCESSING ERROR IN A COMPUTING SYSTEM

TECHNICAL FIELD

The present disclosure relates generally to network communication, and more specifically to a system and method for generating a customized recovery plan for a processing error in a computing system.

BACKGROUND

Errors may occur while processing a job or batch of jobs by a software application, that may cause the jobs or the batch of jobs to fail or otherwise be interrupted which in turn may cause interruption in a service provided by the software application. Presently, basic recovery mechanisms relating to resolving an error associated with processing a job or batch of jobs include re-processing the erroneous job or batch of jobs after a pre-configured time interval of detecting the error. When the basic recovery mechanisms fail to resolve the error, a support team usually analyzes the error and devices a plan to resolve the error.

SUMMARY

The system and method implemented by the system as disclosed in the present disclosure provide technical solutions to the technical problems discussed above by identifying and resolving errors associated with processing jobs or a batch of jobs intelligently, efficiently, and effectively.

For example, the disclosed system and methods provide the practical application of resolving an error associated with a known error message by identifying and implementing a known recovery plan associated with the known error message. As described in embodiments of the present disclosure, in response to detecting that a first error associated with processing a first job by a first software application has occurred, a jobs manager obtains a first error message associated with the first error and determines whether the first error message is one of a plurality of known error messages associated with the first software application. In response to determining that the first error message is one of the known error messages associated with the first software application, the jobs manager obtains a first known recovery plan associated with the first error message and performs one or more recovery steps associated with the first known recovery plan to resolve the first error associated with the first software application.

The disclosed system and methods provide the additional practical application of resolving an error associated with an unknown error message by generating and implementing a customized recovery plan for the unknown error message. For example, as described in embodiments of the present disclosure, in response to determining that the first error message is not one of the known error messages associated with the first software application, the jobs manager determines a second software application of a plurality of software applications that is associated with a same or similar known error message as the first error message and obtains a first known recovery plan associated with the same or similar known error message. The jobs manager then generates a customized recovery plan for the first software application based at least in part upon the first known recovery plan, wherein the customized recovery plan comprises one or more customized recovery steps associated with resolving the first error. The jobs manager performs one or more of the customized recovery steps associated with the customized recovery plan to resolve the first error associated with the first software application.

The disclosed system and methods provide the additional practical application of predicting an error associated with a software application and generating a customized recovery plan for the predicted error. For example, as described in embodiments of the present disclosure, after generating a first customized recovery plan to resolve a first error associated with a first error message generated by a first software application, the jobs manager obtains identities of an input system, an output system or a combination thereof associated with the first software application. In response to determining that a second software application is associated with the same or similar input system, the same or similar output system, or the combination thereof as the first software application, the jobs manager determines that the first error associated with the first software application is predicted to occur relating to the second software application. Thereafter, the jobs manager generates a second customized recovery plan for the second software application based at least in part upon the first customized recovery plan generated for the first software application, wherein the second customized recovery plan comprises a plurality of customized recovery steps to resolve the first error predicted for the second software application. When the predicted error occurs in relation to the second software application, the jobs manager performs the customized recovery steps associated with the second customized recovery plan to resolve the error.

By identifying and resolving an error associated with a software application, the disclosed system and method prevent errors and/or failures associated with processing jobs at computing nodes. By preventing processing errors at computing nodes, the disclosed system and methods improve processing efficiency of the computing nodes.

Thus, the disclosed system and method generally improve technology associated with processing jobs or batch of jobs.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 illustrates a flowchart of an example method for resolution of errors associated with software applications, in accordance with one or more embodiments of the present disclosure;

DETAILED DESCRIPTION

Figure 1:
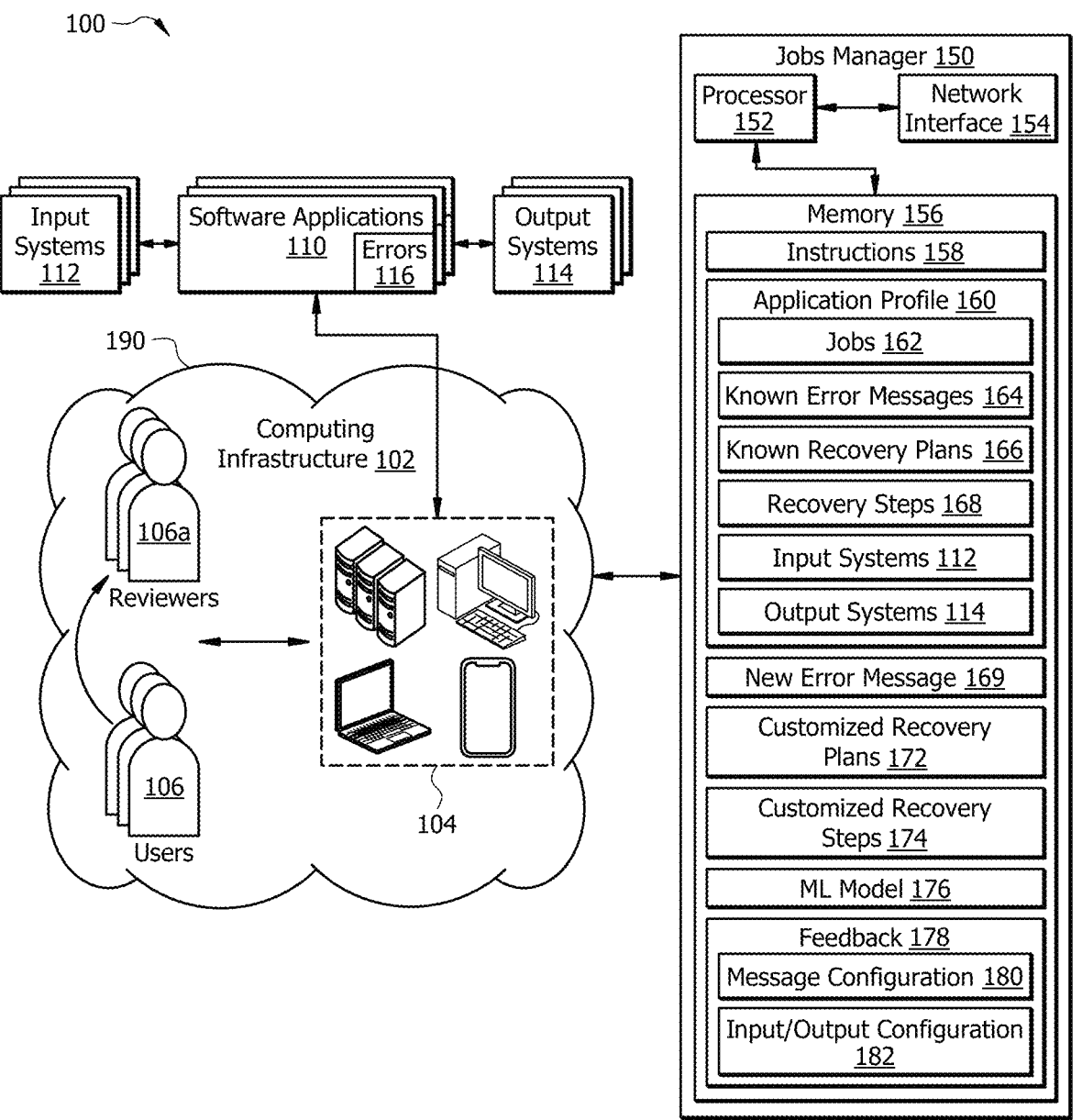
FIG. 1 is a schematic diagram of a system, in accordance with certain aspects of the present disclosure.

FIG. 1 is a schematic diagram of a system 100, in accordance with certain aspects of the present disclosure. As shown, system 100 includes a computing infrastructure 102 connected to a network 190. Computing infrastructure 102 may include a plurality of hardware and software components. The hardware components may include, but are not limited to, computing nodes 104 such as desktop computers, smartphones, tablet computers, laptop computers, servers and data centers, mainframe computers, virtual reality (VR) headsets, augmented reality (AR) glasses and other hardware devices such as printers, routers, hubs, switches, and memory all connected to the network 190. Software components may include software applications 110 that are run by one or more of the computing nodes 104 including, but not limited to, operating systems, user interface applications, third party software, database management software, service management software, mainframe software, metaverse software, AI tools and other customized software programs (e.g., jobs manager 150) implementing particular functionalities. For example, software code relating to one or more software applications 110 may be stored in a memory device and one or more processors (e.g., belonging to one or more computing nodes 104) may execute the software code to implement respective functionalities. An example software application 110 run by one or more computing nodes 104 of the computing infrastructure 102 may include the jobs manager 150. In one embodiment, at least a portion of the computing infrastructure 102 may be representative of an Information Technology (IT) infrastructure of an organization.

One or more of the computing nodes 104 may be operated by a user 106. For example, a computing node 104 may provide a user interface using which a user 106 may operate the computing node 104 to perform data interactions within the computing infrastructure 102. In certain embodiments, one or more users 106 may be registered with an entity that owns or manages the computing infrastructure 102 and may be configured to receive one or more services provided by at least a portion of the computing infrastructure 102. For example, a user 106 may be registered to store a data file having data objects at a server of the computing infrastructure 102 and perform one or more data interactions associated with the data file such as transferring data objects from the data file to another data file and/or receiving data objects into the data file from another data file.

One or more computing nodes 104 of the computing infrastructure 102 may be representative of a computing system which hosts software applications (e.g., software applications 110) that may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the computing nodes 104 may be representative of a server running one or more software applications to implement respective functionality (e.g., jobs manager 150) as described below. In certain embodiments, one or more of the computing nodes 104 may run a thin client software application where the processing is directed by the thin client but largely performed by a central entity such as a server (not shown).

Network 190, in general, may be a wide area network (WAN), a personal area network (PAN), a cellular network, or any other technology that allows devices to communicate electronically with other devices. In one or more embodiments, network 190 may be the Internet.

A software application 110 may be configured to run a plurality of jobs 162 that may also be referred to as processing jobs 162. The term "job" generally refers to a unit of work that is performed by a software application 110. It may be noted that the terms "job" and "processing job" may be used interchangeably in this disclosure. For example, a processing job 162 may include generating a registration for a user based on a user record of the user stored in a database. In some cases, several processing jobs 162 may be performed in conjunction with each other. Such processing of multiple jobs 162 is often referred to as batch processing and the processing jobs 162 that are part of the batch processing are referred to as batch jobs. For example, a batch job processing may include generating a plurality of user registrations for receiving a service based on a plurality of respective user records stored in the database.

A software application 110 that is configured to process a processing job 162 may be communicatively coupled to at least one input system 112, at least one output system 114 or a combination thereof. An input system 112 associated with a particular software application 110 may represent another software application 110, a computing node 104 or a combination thereof that provides input data to the particular software application 110. For example, a software application 110 that generates user registrations may receive user information from user data records stored in a database. In this example, the database that provides the user information is the input system 112 associated with the particular software application 110. An output system 112 associated with a particular software application 110 may represent another software application 110, a computing node 104 or a combination thereof that receives data from the particular software application 110. In one example, the user registration generated by the particular software application 110 may be loaded in a target database. In this case the target database is an output system 114 associated with the particular software application 110. In another example, a servicing system (video streaming service/application) may control dispensing of a service (e.g., video streaming service) based on user registrations generated by the particular software application 110. In this case the servicing system is an output system 114 associated with the particular software application 110. It may be noted that a particular software application 110 may be associated with multiple input systems 112, multiple output systems 114 or a combination thereof. Further, the same input system 112 and/or output system 114 may be associated with several software applications 110. In one embodiment, an input system 112 includes and/or is implemented by a computing node 104 of the computing infrastructure 102. Similarly, an output system 114 includes and/or is implemented by a computing node 104 of the computing infrastructure 102.

In some cases, errors 116 may occur while processing a job 162 or batch of jobs 162 by a software application 110, that may cause the jobs 162 or batch of jobs 162 to fail or otherwise be interrupted which in turn may cause interruption in a service provided by the software application 110. These errors 116 may include an error associated with the software application 110 that is responsible to process the job 162 or batch of jobs 162, an error associated with an input system 112 associated with the software application 110, an error associated with an output system 114 or a combination thereof. Presently, basic recovery mechanisms relating to resolving an error 116 associated with processing a job 162 or batch of jobs 162 include re-processing the erroneous job 162 or batch of jobs 162 after a pre-configured time interval of detecting the error. When the basic recovery mechanisms fail to resolve the error 116, a support team usually analyzes the error 116 and devices a plan to resolve the error 116. These basic recovery mechanisms are ineffi-cient and ineffective in resolving job errors 116 and may cause long delays and interruption in service.

Embodiments of the present disclosure describe tech-niques to resolve errors 116 associated with processing a job 162 or batch of jobs 162 by a software application 110 intelligently, efficiently, and effectively.

At least a portion of the computing infrastructure 102 (e.g., one or more computing nodes 104) may implement jobs manager 150 which may be configured to resolve an error 116 associated with processing a job 162 or batch of jobs 162 by a software application 110. The jobs manager 150 comprises a processor 152, a memory 156, and a network interface 154. The jobs manager 150 may be configured as shown in FIG. 1 or in any other suitable configuration.

The processor 152 comprises one or more processors operably coupled to the memory 156. The processor 152 is any electronic circuitry including, but not limited to, state machines, one or more central processing unit (CPU) chips, logic units, cores (e.g., a multi-core processor), field-pro-grammable gate array (FPGAs), application specific inte-grated circuits (ASICs), or digital signal processors (DSPs). The processor 152 may be a programmable logic device, a microcontroller, a microprocessor, or any suitable combina-tion of the preceding. The processor 152 is communicatively coupled to and in signal communication with the memory 156. The one or more processors are configured to process data and may be implemented in hardware or software. For example, the processor 152 may be 8-bit, 16-bit, 32-bit, 64-bit or of any other suitable architecture. The processor 152 may include an arithmetic logic unit (ALU) for per-forming arithmetic and logic operations, processor registers that supply operands to the ALU and store the results of ALU operations, and a control unit that fetches instructions from memory and executes them by directing the coordi-nated operations of the ALU, registers and other compo-nents.

The one or more processors are configured to implement various instructions, such as software instructions. For example, the one or more processors are configured to execute instructions 158 to implement the jobs manager 150. In this way, processor 152 may be a special-purpose com-puter designed to implement the functions disclosed herein. In one or more embodiments, the jobs manager 150 is implemented using logic units, FPGAs, ASICs, DSPs, or any other suitable hardware. The jobs manager 150 is configured to operate as described with reference to FIGS. 2, 3 and 4. For example, the processor 152 may be configured to perform at least a portion of the methods 200, 300 and 400 as described in FIGS. 2, 3 and 4 respectively.

The memory 156 comprises a non-transitory computer-readable medium such as one or more disks, tape drives, or solid-state drives, and may be used as an over-flow data storage device, to store programs when such programs are selected for execution, and to store instructions and data that are read during program execution. The memory 156 may be volatile or non-volatile and may comprise a read-only memory (ROM), random-access memory (RAM), ternary content-addressable memory (TCAM), dynamic random-access memory (DRAM), and static random-access memory (SRAM).

The memory 156 is operable to store instructions 158, application profile 160 associated with software applications 110, unknown error messages 170 associated with errors 116 (e.g., newly detected errors 116), customized recovery plans 172 generated to resolve errors 116 associated with unknown error messages 170, customized recovery steps 174 contained in the customized recovery plans 172, one or more machine learning models 176, feedback relating to customized recovery plans 172 received from one or more reviewers 106a, and any other data needed to performed operations of the jobs manager 150 as described in embodi-ments of the present disclosure. The instructions 158 may include any suitable set of instructions, logic, rules, or code operable to execute the jobs manager 150.

The network interface 154 is configured to enable wired and/or wireless communications. The network interface 154 is configured to communicate data between the jobs man-ager 150 and other devices, systems, or domains (e.g., other computing nodes 104 etc.). For example, the network inter-face 154 may comprise a Wi-Fi interface, a LAN interface, a WAN interface, a modem, a switch, or a router. The processor 152 is configured to send and receive data using the network interface 154.

The network interface 154 may be configured to use any suitable type of communication protocol as would be appre-ciated by one of ordinary skill in the art.

It may be noted that each of the computing nodes 104 may be implemented like the jobs manager 150 shown in FIG. 1. For example, each of the computing nodes 104 may have a respective processor and a memory that stores data and instructions to perform a respective functionality of the computing node 104.

In one or more embodiments, the jobs manager 150 may be configured to resolve errors 116 associated with process-ing a job 162 or batch of jobs 162 by a software application 110 intelligently, efficiently, and effectively.

The jobs manager 150 may have access to (e.g., stored in memory 156) an application profile 160 associated with each of a plurality of software applications 110 that are config-ured to process jobs 162 or a batch of jobs 162, wherein each application profile 160 corresponds to a particular software application 110. As shown in FIG. 1, an application profile 160 associated with a particular software application 110 may include, but is not limited to, one or more jobs 162 that the particular software application is configured to perform, one or more known error messages 164 associated with errors 116 known to occur when processing jobs 162 asso-ciated with the particular software application 110, one or more known recovery plans 166 associated with the respec-tive one or more known error messages 164, a plurality of recovery steps 168, identities of one or more input system associated with the particular software application 110, identities of one or more output systems 114 associated with the particular software application 110, or a combination thereof.

Each known error message 164 included in an application profile associated with a particular software application 110 corresponds to a particular error 116 known to occur when processing a job 162 or a batch of jobs 162 associated with the particular software application 110. Each known recov-ery plan 166 corresponds to a particular known error mes-sage 164 and includes one or more recovery steps 168 configured to resolve an error 116 associated with the known error message 164. A known recovery plan 166 may include a plurality of recovery steps 168 that are configured to be performed in a pre-set sequence. In an alternative embodi-ment, a known recovery plan 166 may include a plurality of recovery steps 168 that are configured to be performed in conjunction to (e.g., simultaneously/in parallel) each other. In another alternative embodiment, a known recovery plan 166 may include a plurality of recovery steps 168, wherein two or more of the recovery steps 168 may be configured to be performed in a pre-set sequence and two or more of the recovery steps may be configured to be performed in conjunction to (e.g., simultaneously/in parallel) each other.

A recovery step 168 may be any configured action or procedure that can be performed as part of resolving a particular error 116. Example recovery steps 168 may include, but are not limited to, retry processing job after pre-configured time interval, clear memory, re-launch software application, update software application, re-start computing node, notify application team, send email to database team, generate incident ticket, and monitor incident ticket. For example, a known recovery plan 166 for resolving a known database error associated with a particular software application 110 may include the example recovery steps 168 of email administrator, create incident ticket, monitor incident ticket for resolution of the error, re-run job when the error has been resolve.

In certain embodiments, the particular recovery steps 168 included in a particular known recovery plan 166 may depend on a plurality of factor including, but not limited to, the particular known error message 164 to which the known recovery plan 166 belongs, particular software application 110 to which the known error message 164 belongs, the particular input systems 112 associated with the software application 110, the particular output systems 114 associated with the software application 110, or a combination thereof. For example, a first software application 110 may use a first IT service management (ITSM) tool (e.g., JIRA) for incident management and a second software application 110 may use a second ITSM tool (e.g., ServiceNow) for incident management. Thus, a known recovery plan 166 associated with the first software application 110 may include recovery steps 168 specific to the JIRA tool such as create JIRA incident ticket and monitor JIRA incident ticket. On the other hand, the second software application 110 may include recovery steps 168 specific to the ServiceNow tool such as create ServiceNow incident ticket and monitor ServiceNow incident ticket.

In this context, the jobs manager 150 may store a mapping between one or more recovery steps 168 associated with an application profile 160 (e.g., that are part of known recovery plans 166 associated with the application profile 160) and specific input systems 112 and/or output systems 114 that are associated with the software application 110 to which the application profile 160 belongs. A recovery step 168a mapped to a specific input system 112 or a specific output system 114 is a recovery step 168 that is generally used as part of resolving a known error 116 associated with the specific input system 112 or the specific output system 114 respectively. For example, recovery steps 168 mapped to a JIRA tool that is used as an output system 114 for a first software application 110 may include create JIRA incident ticket and monitor JIRA incident ticket. On the other hand, recovery steps 168 mapped to a ServiceNow tool that is used as an output system 114 for a second software application 110 may include create ServiceNow incident ticket and monitor ServiceNow incident ticket.

In one or more embodiments, an application profile 160 or a portion thereof associated with a particular software application 110 may be defined by a user 106 (e.g., an administrator). For example, jobs manager 150 may be configured to receive the application profile 160 or a portion thereof from a user 106 or some other computing node 104 and store the same in memory 156.

As noted above, jobs manager 150 may be configured to resolve errors 116 associated with processing a job 162 or a batch of jobs 162 by a software application 110. Jobs manager 150 may be configured to monitor processing of jobs 162 by software applications 110 within the computing infrastructure 102. When an error 116 occurs in processing of a job 162 or a batch of jobs 162 associated with a software application 110, the jobs manager 150 obtains a new error message 169 associated with the error 116. For example, when an error 116 occurs during processing of a job 162 or a batch of jobs 162 associated with a software application 110, the software application 110 generally generates a new error message 169 that is indicative of the specific error 116 that has occurred. In some embodiments, the new error message 169 generated by the software application 110 may include a description of the specific error 116 that has occurred. For example, when the error 116 originates from an input system 112 or an output system 114 associated with the software application 110, the new error message 169 may include an identity of the input system 112 or the output system 114 as the case may be and the type of error 116 (e.g., database access error, certificate expired error, login credentials error, loading error etc.) that has occurred.

Once the new error message 169 associated with the error 116 relating to the software application 119 is obtained, jobs manager 150 checks whether the new error message 169 is a known error message 164 associated with the software application 110. For example, the jobs manager 150 accesses the application profile 160 of the software application 110 and compares the new error message 169 to each known error message 164 that is part of the application profile 160. When the new error message 169 matches with a known error message 164 associated with the software application 110, jobs manager 150 determines that the new error message 169 is a known error message 164 associated with the software application 110. This means that the new error message 169 is same as a known error message 164 that was previously recorded relating to the same software application 110. For example, when a database access error occurs while processing a job 162 by the software application 110, the software application 110 may generate a new error message (e.g., db_error) indicating that the database error has occurred. When the same db_error message is stored as a known error message 164 as part of the application profile of the software application 110, jobs manager 150 determines that the new db_error message is same as the known db_error message.

In response to determining that the new error message 169 is same as a particular known error message 164, the jobs manager 150 obtains and runs the known recovery plan 166 associated with the particular known error message 164 to resolve the error 116 associated with the software application 110. Running the known recovery plan 166 includes performing the recovery steps 168 included in the known recovery plan 166.

In additional or alternative embodiments, when a new error message 169 does not match with any of the known error messages 164 configured for a software application 110 (hereinafter first software application 110) to which the new error message 169 belongs, jobs manager 150 may be configured to determine another software application 110 (hereinafter second software application) that is associated with a same or similar known error message 164 as the new error message 169. For example, jobs manager 150 compares the new error message 169 associated with the first software application 110 with the known error messages 164 associated with a plurality of software applications 110 and tries to find a known error message 164 configured for a second software application 110 that is same as or at least closely matches the new error message 169 associated with the first software application 110. For example, when the new error message 169 associated with the first software application 110 is db_error and a known error message 164 associated with a second software application is an exact match (e.g., also db_error), the jobs manager 150 determines that the second software application 110 is associated with a same known error message 164 as the new error message 169 associated with the first software application 110.

However, in some cases, different software applications 110 may identify the same or similar error 116 with different error messages. For example, a database error may be identified by different software applications as db_error, oracle_db_error, database_error or the like. Jobs manager 150 may be configured to identify similar error messages that are associated with a same or similar type of error. For example, when the new error message 169 associated with the first software application 110 is db_error and a second software application 110 is associated with a known error message 164 that is identified as database_error, jobs manager 150 may be configured to determine that database_error is similar to db_error.

In response to determining a second software application that is associated with a same or similar known error message 164 as the new error message 169, jobs manager 150 may be configured to obtain a known recovery plan 166 associated with the same or similar known error message 164 and perform one or more recovery steps 168 from the known recovery plan 166 to resolve the error 116 associated with the first software application 110.

In one or more embodiments, jobs manager 150 may be configured to search for a same or similar known error message 164 associated with a second software application 110 that is associated with similar input systems 112 and output systems 114 as the first software application 110. In other words, jobs manager 150 searches for a second software application 110 that is a close match to the first software application 110 in terms of input systems 112 and/or output systems 114 associated with the two software applications 110. For example, the jobs manager 150 first searches for those software applications 110 that are associated with at least one input system, at least one output system, or a combination thereof that are also associated with the first software application 110. It may be noted that jobs manager 150 may not find a software application 110 that is an exact match to the first software application 110 in terms of the input system 112 and the output systems 114. For example, jobs manager 150 may not find a software application 110 that is associated with all the same input systems 112 and output systems 114 as the first software application 110. In such a case, the jobs manager 150 may be configured to identify a partial match to the first software application 110. For example, jobs manager 150 may find, among a plurality of software applications 110, one or more software applications 110 that are associated with one or more of the same input systems 112 and the output systems 114 as the first software application 110. Thus, the software applications 110 identified by the jobs manager 150 may include one or more software applications that are an exact match to the first software application in terms of input systems 112 and output systems 114. Additionally or alternatively, the software applications 110 identified by the jobs manager 150 may include one or more software applications that are partial matches to the first software application in terms of input systems 112 and output systems 114.

Once one or more software applications 110 are identified that are associated with at least one input system, at least one output system, or a combination thereof that are also associated with the first software application 110, the jobs manager 150 searches for a second software application 110 from the one or more identified software application 110, that is configured with a same or similar known error message 164 as the new error message 169. In other words, the jobs manager 150 searches for a same or similar known error message 164 among the known error messages 164 defined for only those one or more identified software applications 110 that have at least one input/output system also associated with the first software application 110.

In response to determining a second software application (e.g., from the identified one or more software applications with similar input/output systems as described above) that is associated with a same or similar known error message 164 as the new error message 169, jobs manager 150 may be configured to obtain a known recovery plan 166 associated with the identified same or similar known error message 164. Jobs manager 150 may be configured to generate a customized recovery plan 172 for the new error message 169 associated with the first software application 110, by customizing the known recovery plan 166 associated with the identified same or similar known error message 164 to suit the first software application 110. The customized recovery plan 172 includes one or more customized recovery steps 174 configured to resolve the error 116 associated with the new error message 169. In one embodiment, the customized recovery steps 174 may include one or more customized recovery steps 174 that are configured to be performed in a sequence, one or more customized recovery steps 174 that are configured to be performed in conjunction to each other (e.g., in parallel), or a combination thereof.

In one or more embodiments, to generate the customized recovery plan 172, jobs manager 150 may be configured to customize the known recovery plan 166 associated with the identified same or similar known error message 164 by replacing one or more recovery steps 168 from the known recovery plan 166 with respective one or more customized recovery steps that are specific to input systems 112 and/or output systems associated with the first software application 110. For example, the second software application 110 to which the known recovery plan 166 belongs may be associated with one or more input/output systems that are different from the input/output systems associated with the first software application 110. Accordingly, one or more recovery steps 168 included in the known recovery plan 166 may be directed to specific input and/or output systems associated with the second software application 110 and may not apply to the first software application 110 which may not have the same input and output systems. In such a case, the jobs manager 150 may replace those one or more recovery steps 168 with customized recovery steps 174 that are directed to input and/or output system associated with the first software application 110. In this context, jobs manager 150 first identifies those recovery steps 168 from the known recovery plan 166 that are directed to input and/or output systems not associated with the first software application 110. Then jobs manager 150 identifies (e.g., from the application profile 160 of the first software application 110) those recovery steps 168 that are mapped to input and/or output system that are similar to the respective input and/or output systems to which the identified recovery steps 168 from the known recovery plan 166 are directed to. Jobs manager 150 then replaces each identified recovery step 168 from the known recovery plan 166 with a corresponding recovery step 168 that is mapped to a similar input and/or output system associated with the first software application 110. For example, the first software application 110 may use a JIRA tool as an output system 114, while the second software application 110 may use ServiceNow tool as an output system 114. The known recovery plan 166 associated with the second software application 110 may include "create ServiceNow ticket" and "monitor ServiceNow ticket" as two recovery steps 168. Jobs manager 150 may replace these two recovery steps 168 with "create JIRA ticket" and "monitor JIRA ticket" that are mapped to the first software application 110. Accordingly, the customized recovery steps 174 of the customized recovery plan 172 generated for the first software application 110 may include the two replaced recovery steps 168 and remaining original recovery steps 168 from the known recovery plan 166 associated with the second software application 110.

In one or more embodiments, the jobs manager 150 may be configured to perform the customized recovery steps 174 associated with the customized recovery plan 172 to resolve the error 116 associated with the new error message 169 of first software application 110.

It may be noted that a customized recovery step 174 included in the customized recovery plan 172 generated for the first software application may include a recovery step 168 that was part of the known recovery plan 166 associated with the second software application 110 or a recovery step 168 that was replaced to suit an input/output system associated with the first software application.

In one or more embodiments, jobs manager 150 may be configured to use a machine learning (ML) model 176 that is trained to generate customized recovery plans 172 to resolve errors 116 associated with new error messages 169 that do not have a configured known recovery plan 166. The jobs manager 150 may input to the ML model 176 a new error message 169 generated by a first software application 110 and application profiles 160 associated with a plurality of software applications 110 including known error messages, known recovery plans 166, recovery steps 168, identities of input systems 112, identities of output systems 114, and mapping of recovery steps 168 to specific input systems 112 and output systems 114. Based on these inputs, the ML model 176 may be configured to generate a customized recovery plan 172 for resolving the error 116 indicated by the new error message 169 generated by the first software application 110. In one embodiment, the new error message 169 and the customized recovery plan 172 are stored, as part of the application profile 160 of the first software application 110, as a known error message 164 and an associated known recovery plan 166 respectively.

Jobs manager 150 may be configured to receive feedback 178 relating to several factors associated with generating a customized recovery plan 172 for resolving an error 116 indicated by a new error message 169 generated by a first software application 110. In this context, one or more users 106 may be designated as reviewers 106a who are responsible to provide several types of feedback 178 relating to generating customized recovery plans 172 for new error messages 169. For example, feedback 178 (e.g., received from one or more reviewers 106a) may include message configuration 180 that includes groups of error messages (e.g., including new error messages 169 and known error messages 164) that may be considered similar error messages. As described above, different software applications 110 may identify the same or similar error 116 with different error messages and that jobs manager 150 may be configured to identify similar error messages that are associated with a same or similar type of error 116. In this context, jobs manager 150 may be configured to identify that a known error message 164 is similar to a new error message 169 based on message configuration 180 (e.g., received as part of a feedback 178) relating to which error messages are to be considered as similar error messages. For example, message configuration 180 may define that error messages db_error, oracle_db_error, and database_error are to be considered similar error messages. Thus, assuming that a new error message 169 is db_error, based on the message configuration, job manager 150 may determine that a known error message 164 of database_error is similar to the new error message 169.

In additional or alternative embodiments, feedback 178 (e.g., received from one or more reviewers 106a) may include input/output configuration 182 that specifies which input/output systems are considered similar to each other. In this context, two input systems 112 are considered similar systems when both input systems 112 provide similar functionality. Similarly, two output systems 114 are considered similar systems when both output systems 114 provide similar functionality. For example, input/output configuration 182 may specify that a JIRA output system is similar to the ServiceNow output system. Jobs manager 150 may use the input/output configuration 182 to identify software applications 110 that are associated with similar input/output systems. Further, the input/output configuration 182 allows the jobs manager 150 to find replacement recovery steps 168 (e.g., when generating a customized recovery plan 172) to suit input/output systems associated with the first software application 110. For example, based on the input/output configuration 182, jobs manager 150 may find a similar input system 112 or a similar output system 114 (associated with the first software application 110) that is similar to a respective input or output system associated with a recovery step 168 in a known recovery plan 166 (associated with the second software application 110). Then jobs manager 150 may replace the recovery step 168 in the known recovery plan 166 with a recovery step 168 mapped to the identified similar input or output system associated with the first software application 110.

In further additional or alternative embodiments, jobs manager 150 may seek and receive feedback 178 relating to a customized recovery plan 172 generated by the jobs manager 150 (e.g., using the ML model 176). For example, once a customized recovery plan 172 including customized recovery steps 174 has been generated by the jobs manager 150 to resolve an error 116 associated with a new error message 169, jobs manager 150 may be configured to transmit the customized recovery plan 172 to a designated reviewer 106a to receive feedback 178 relating to the customized recovery plan 172. The feedback 178 relating to the customized recovery plan 172 from the reviewer 106a may include changes to one or more customized recovery steps 174 included in the customized recovery plan 172. For example, the feedback 178 relating to the customized recovery plan 172 may include, but is not limited to, deletion of one or more customized recovery steps 174, addition of one or more new customized recovery steps 174, modification of one or more customized recovery steps 174, or a combination thereof. In one embodiment, the jobs manager 150 may be configured to retrain the ML model based on the feedback 178 received relating to customized recovery plans 172 generated for respective software applications 110.

In one or more embodiments, jobs manager 150 may be configured to generate an updated customized recovery plan 172 based on the feedback 178 and perform the customized recovery steps 174 from the updated customized recovery plan 172 to resolve the error 116 associated with the first software application 110.

It may be noted that references to customized recovery plan 172 in the remainder of the present disclosure may correspond to a customized recovery plan 172 before any updates are made to the plan based on feedback 178 or an updated customized recovery plan 172 that was updated based on feedback 178.

Predicting Errors Associated with Software Applications

In one or more embodiments, jobs manager 150 may be configured to predict an error 116 that may occur relating to a particular software application 110 and subsequently generate a customized recovery plan 172 to resolve the predicted error 116 in case the predicted error 116 occurs relating to the software application 110.

When the jobs manager 150 has generated a customized recovery plan 172 (hereinafter referred to as first customized recovery plan 172) as described above for a first software application 110 to resolve an error 116 associated with a new error message 169, jobs manager 150 may be configured to determine whether the same error 116 may occur when processing one or more jobs 162 associated with other software applications 110. Jobs manager 150 first obtains identities of input system(s) 112 and output system(s) 114 associated with the first software application 110 to which the first customized recovery plan 172 belongs. Jobs manager 150 may obtain the identities of input system(s) 112 and output system(s) 114 associated with the first software application 110 from the application profile 160 associated with the first software application 110. Then, based on the application profiles 160 of a plurality of other software applications 110, jobs manager 150 may be configured to search for those software applications 110 that are associated with at least one input system, at least one output system, or a combination thereof that are also associated with the first software application 110. For example, based on searching the application profiles 160 of a plurality of other software applications 110, the jobs manager 150 may identify another software application 110 (hereinafter third software application 110) that is associated with at least one input system, at least one output system, or a combination thereof that are also associated with the first software application 110. Essentially, the jobs manager 150 may be configured to identify a partial match to the first software application 110. For example, jobs manager 150 may find, among the plurality of software applications 110, one or more software applications 110 that are associated with one or more of the same input systems 112 and the output systems 114 as the first software application 110.

In response to determining a third software application 110 that is associated with at least one input system, at least one output system, or a combination thereof that are also associated with the first software application 110, jobs manager 150 may be configured to determine that the error 116 associated with the first software application 110 (e.g., associated with the new error message 169) may also occur in relation to the third software application 110. In other words, jobs manager 150 predicts that the error 116 that was detected in relation to the first software application may also occur in relation to the third software application 110 as the first software application 110 and the third software application 110 are at least a partial match with regard to input and output systems associated with the two software applications.

Once the jobs manager 150 determines that the first error 116 detected in relation to the first software application 110 is predicted to occur in relation to the third software application 110, jobs manager 150 may be configured to generate a customized recovery plan 172 (hereinafter a second customized recovery plan 172) for resolving the predicted error 116 whenever the error 116 subsequently occurs in relation to the third software application 110, wherein the second customized recovery plan 172 includes one or more customized recovery steps 174 that may be performed to resolve the error 116 relating to the third software application.

In one or more embodiments, to generate the second customized recovery plan 172 for the third software application 110, jobs manager 150 may be configured to customize the first customized recovery plan 172 generated for the first software application 110 by replacing one or more recovery steps 168 from the first customized recovery plan 172 with respective one or more customized recovery steps 174 that are specific to input systems 112 and/or output systems associated with the third software application 110. For example, the first software application 110 to which the first customized recovery plan 172 belongs may be associated with one or more input/output systems that are different from the input/output systems associated with the third software application 110. Accordingly, one or more customized recovery steps 174 included in the first customized recovery plan 172 may be directed to specific input and/or output systems associated with the first software application 110 and may not apply to the third software application 110 which may not have the same input and output systems. In such a case, the jobs manager 150 may replace those one or more customized recovery steps 174 with recovery steps 168 that are directed to input and/or output system associated with the third software application 110. In this context, jobs manager 150 first identifies those customized recovery steps 174 from the first customized recovery plan 172 that are directed to input and/or output systems not associated with the third software application 110. Then jobs manager 150 identifies (e.g., from the application profile 160 of the third software application 110) those recovery steps 168 that are mapped to input and/or output system that are similar to the respective input and/or output systems to which the identified customized recovery steps 174 from the first customized recovery plan 172 are directed to. Jobs manager 150 then replaces each identified customized recovery step 174 from the first customized recovery plan 172 with a corresponding recovery step 168 that is mapped to a similar input and/or output system associated with the third software application 110. For example, the first software application 110 may use a ServiceNow tool as an output system 114, while the third software application 110 may use JIRA tool as an output system 114. The first customized recovery plan 172 associated with the first software application 110 may include "create ServiceNow ticket" and "monitor ServiceNow ticket" as two customized recovery steps 174. Jobs manager 150 may replace these two customized recovery steps 174 with "create JIRA ticket" and "monitor JIRA ticket" that are mapped to the third software application 110. Accordingly, the customized recovery steps 174 of the second customized recovery plan 172 generated for the third software application 110 may include the two replaced recovery steps 168 and remaining original customized recovery steps 174 from the first customized recovery plan 172 associated with the first software application 110.

Jobs manager 150 may be configured to store as part of the application profile of the third software application, the new error message 169 detected in relation to the first software application and the second customized recovery plan 172 as a known error message 164 and known recovery plan 166 respectively. In one or more embodiments, in response to detecting that the error 116 has occurred in relation to the third software application 110 and that the known error message 164 (which is same as the new error message associated with the first software application 110) has been generated, the jobs manager 150 performs the recovery steps 168 of the known recovery plan 166 (which are same as the customized recovery steps of the second customized recovery plan 172) associated with the known error message to resolve the error 116.

In one or more embodiments, to generate the second customized recovery plan 172, jobs manager 150 may be configured to use the machine learning (ML) model 176 that is trained to generate customized recovery plans 172. The jobs manager 150 may input to the ML model 176 the first customized recovery plan 172 generated for the first software application 110 and application profiles 160 associated with a plurality of software applications 110 including known error messages, known recovery plans 166, recovery steps 168, identities of input systems 112, identities of output systems 114, and mapping of recovery steps 168 to specific input systems 112 and output systems 114. Based on these inputs, the ML model 176 may be configured to generate the second customized recovery plan 172 for the third software application 110.

In certain embodiments, jobs manager 150 may seek and receive feedback 178 relating to the second customized recovery plan 172 generated by the jobs manager 150 (e.g., using the ML model 176). For example, once the second customized recovery plan 172 including customized recovery steps 174 has been generated, the jobs manager 150 may be configured to transmit the second customized recovery plan 172 to a designated reviewer 106a to receive feedback 178 relating to the second customized recovery plan 172. The feedback 178 relating to the second customized recovery plan 172 from the reviewer 106a may include changes to one or more customized recovery steps 174 included in the second customized recovery plan 172. For example, the feedback 178 relating to the second customized recovery plan 172 may include, but is not limited to, deletion of one or more customized recovery steps 174, addition of one or more new customized recovery steps 174, modification of one or more customized recovery steps 174, or a combination thereof. In one embodiment, the jobs manager 150 may be configured to retrain the ML model based on the feedback 178 received relating to the second customized recovery plan 172.

In one or more embodiments, jobs manager 150 may be configured to generate an updated second customized recovery plan 172 based on the feedback 178 and perform the customized recovery steps 174 from the updated second customized recovery plan 172 to resolve the error 116 associated with the third software application 110.

FIG. 2 illustrates a flowchart of an example method 200 for resolution of errors associated with software applications, in accordance with one or more embodiments of the present disclosure. Method 200 may be performed by the jobs manager 150 shown in FIG. 1.

At operation 202, the jobs manager 150 receives and stores, for each software application 110 of a plurality of software applications 110, a list of known error messages 164 relating to processing jobs 162 associated with the software application 110, a known recovery plan 166 associated with each known error message 164, wherein each known recovery plan 166 includes one or more recovery steps 168 that are to be processed to resolve an error 116 associated with the known error message 164.

As described above, the jobs manager 150 may have access to (e.g., stored in memory 156) an application profile 160 associated with each of a plurality of software applications 110 that are configured to process jobs 162 or a batch of jobs 162, wherein each application profile 160 corresponds to a particular software application 110. As shown in FIG. 1, an application profile 160 associated with a particular software application 110 may include, but is not limited to, one or more jobs 162 that the particular software application is configured to perform, one or more known error messages 164 associated with errors 116 known to occur when processing jobs 162 associated with the particular software application 110, one or more known recovery plans 166 associated with the respective one or more known error messages 164, a plurality of recovery steps 168, identities of one or more input system associated with the particular software application 110, identities of one or more output systems 114 associated with the particular software application 110, or a combination thereof.

Each known error message 164 included in an application profile associated with a particular software application 110 corresponds to a particular error 116 known to occur when processing a job 162 or a batch of jobs 162 associated with the particular software application 110. Each known recovery plan 166 corresponds to a particular known error message 164 and includes one or more recovery steps 168 configured to resolve an error 116 associated with the known error message 164. A known recovery plan 166 may include a plurality of recovery steps 168 that are configured to be performed in a pre-set sequence. In an alternative embodiment, a known recovery plan 166 may include a plurality of recovery steps 168 that are configured to be performed in conjunction to (e.g., simultaneously/in parallel) each other. In another alternative embodiment, a known recovery plan 166 may include a plurality of recovery steps 168, wherein two or more of the recovery steps 168 may be configured to be performed in a pre-set sequence and two or more of the recovery steps may be configured to be performed in conjunction to (e.g., simultaneously/in parallel) each other.

A recovery step 168 may be any configured action or procedure that can be performed as part of resolving a particular error 116. Example recovery steps 168 may include, but are not limited to, retry processing job after pre-configured time interval, clear memory, re-launch software application, update software application, re-start computing node, notify application team, send email to database team, generate incident ticket, and monitor incident ticket. For example, a known recovery plan 166 for resolving a known database error associated with a particular software application 110 may include the example recovery steps 168 of email administrator, create incident ticket, monitor incident ticket for resolution of the error, re-run job when the error has been resolve.

In certain embodiments, the particular recovery steps 168 included in a particular known recovery plan 166 may depend on a plurality of factor including, but not limited to, the particular known error message 164 to which the known recovery plan 166 belongs, particular software application 110 to which the known error message 164 belongs, the particular input systems 112 associated with the software application 110, the particular output systems 114 associated with the software application 110, or a combination thereof. For example, a first software application 110 may use a first IT service management (ITSM) tool (e.g., JIRA) for incident management and a second software application 110 may use a second ITSM tool (e.g., ServiceNow) for incident management. Thus, a known recovery plan 166 associated with the first software application 110 may include recovery steps 168 specific to the JIRA tool such as create JIRA incident ticket and monitor JIRA incident ticket. On the other hand, the second software application 110 may include recovery steps 168 specific to the ServiceNow tool such as create ServiceNow incident ticket and monitor ServiceNow incident ticket.

In this context, the jobs manager 150 may store a mapping between one or more recovery steps 168 associated with an application profile 160 (e.g., that are part of known recovery plans 166 associated with the application profile 160) and specific input systems 112 and/or output systems 114 that are associated with the software application 110 to which the application profile 160 belongs. A recovery step 168a mapped to a specific input system 112 or a specific output system 114 is a recovery step 168 that is generally used as part of resolving a known error 116 associated with the specific input system 112 or the specific output system 114 respectively. For example, recovery steps 168 mapped to a JIRA tool that is used as an output system 114 for a first software application 110 may include create JIRA incident ticket and monitor JIRA incident ticket. On the other hand, recovery steps 168 mapped to a ServiceNow tool that is used as an output system 114 for a second software application 110 may include create ServiceNow incident ticket and monitor ServiceNow incident ticket.

At operation 204, the jobs manager 150 detects that a first error (e.g., an error 116) associated with processing a first job (e.g., a job 162) by a first software application 110 of the plurality of software applications 110 has occurred.

At operation 206, the jobs manager 150 obtains a first error message (e.g., a new error message 169) associated with the first error 116.

As described above, jobs manager 150 may be configured to resolve errors 116 associated with processing a job 162 or a batch of jobs 162 by a software application 110. Jobs manager 150 may be configured to monitor processing of jobs 162 by software applications 110 within the computing infrastructure 102. When an error 116 occurs in processing of a job 162 or a batch of jobs 162 associated with a software application 110, the jobs manager 150 obtains a new error message 169 associated with the error 116. For example, when an error 116 occurs during processing of a job 162 or a batch of jobs 162 associated with a software application 110, the software application 110 generally generates a new error message 169 that is indicative of the specific error 116 that has occurred. In some embodiments, the new error message 169 generated by the software application 110 may include a description of the specific error 116 that has occurred. For example, when the error 116 originates from an input system 112 or an output system 114 associated with the software application 110, the new error message 169 may include an identity of the input system 112 or the output system 114 as the case may be and the type of error 116 (e.g., database access error, certificate expired error, login credentials error, loading error etc.) that has occurred.

At operation 208, the jobs manager 150 determines whether the first error message (e.g., new error message 169) is one of the known error messages 164 associated with the first software application 110.

As described above, once the new error message 169 associated with the error 116 relating to the software application 119 is obtained, jobs manager 150 checks whether the new error message 169 is a known error message 164 associated with the software application 110. For example, the jobs manager 150 accesses the application profile 160 of the software application 110 and compares the new error message 169 to each known error message 164 that is part of the application profile 160. When the new error message 169 matches with a known error message 164 associated with the software application 110, jobs manager 150 determines that the new error message 169 is a known error message 164 associated with the software application 110. This means that the new error message 169 is same as a known error message 164 that was previously recorded relating to the same software application 110. For example, when a database access error occurs while processing a job 162 by the software application 110, the software application 110 may generate a new error message (e.g., db_error) indicating that the database error has occurred. When the same db_error message is stored as a known error message 164 as part of the application profile of the software application 110, jobs manager 150 determines that the new db_error message is same as the known db_error message.

If the first error message is not one of the known error messages 164 associated with the first software application 110, method 200 proceeds to operation 214 and 216 where the jobs manager 150 generates a customized recovery plan 172 and performs one or more customized recovery steps 174 from the customized recovery plan 172 to resolve the first error 116 associated with the first software application 110. On the other hand, if the first error message is determined to be one of the known error messages 164 associated with the first software application 110, method 200 proceeds to operation 210.

At operation 210, in response to determining that the first error message (e.g., new error message 169) is one of the known error messages 164 associated with the first software application 110, the jobs manager 150 obtains from the memory (e.g., memory 156) a first known recovery plan 166 associated with the known error message 164 that corresponds to the first error message.

At operation 212, the jobs manager 150 performs one or more recovery steps 168) associated with the first known recovery plan 166 to resolve the first error 116 associated with the first software application 110.

As described above, in response to determining that the new error message 169 is same as a particular known error message 164, the jobs manager 150 obtains and runs the known recovery plan 166 associated with the particular known error message 164 to resolve the error 116 associated with the software application 110. Running the known recovery plan 166 includes performing the recovery steps 168 included in the known recovery plan 166.

Figure 3:
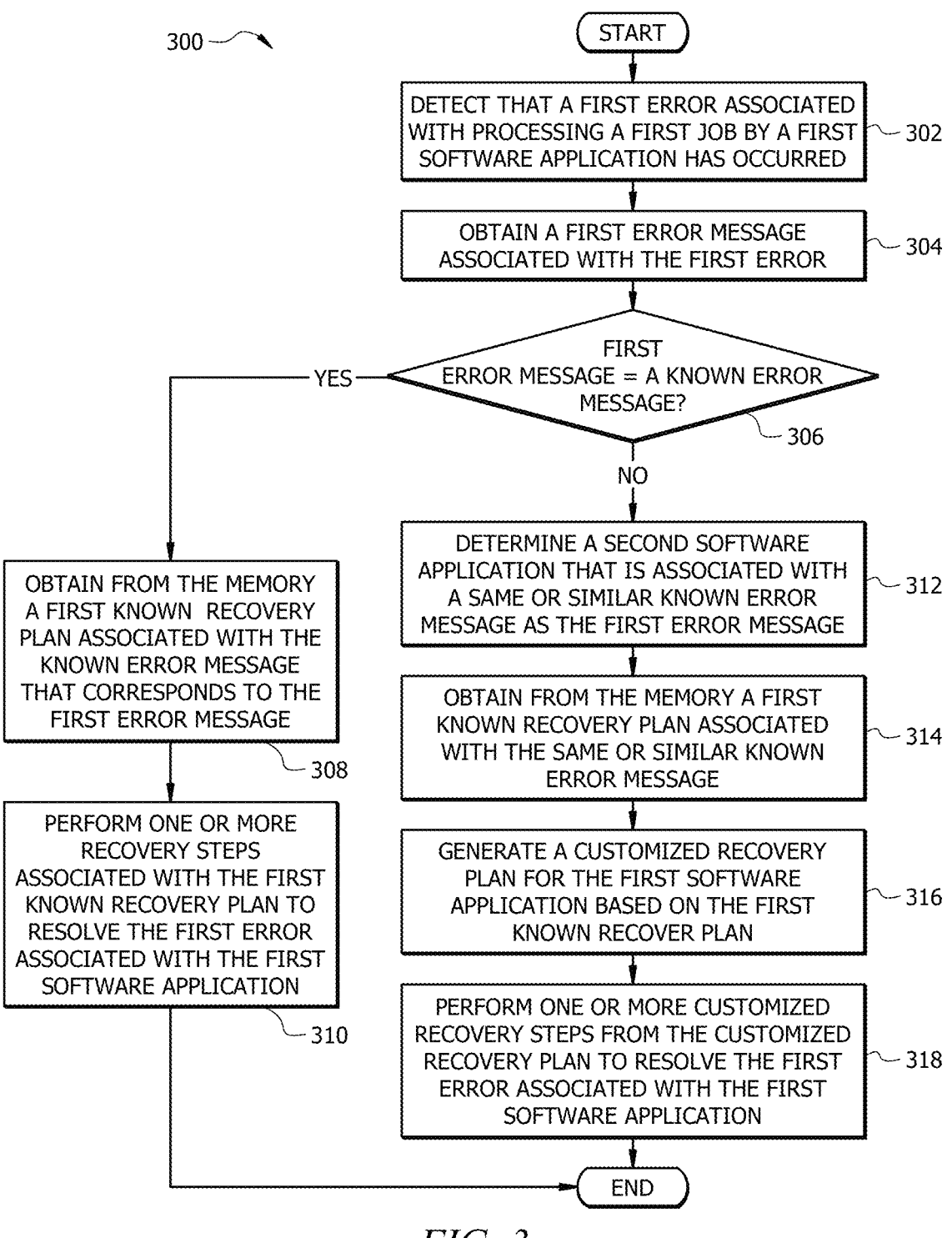
FIG. 3 illustrates a flowchart of an example method for resolution of errors associated with software applications, in accordance with one or more embodiments of the present disclosure.

FIG. 3 illustrates a flowchart of an example method 300 for resolution of errors associated with software applications, in accordance with one or more embodiments of the present disclosure. Method 300 may be performed by the jobs manager 150 shown in FIG. 1.

At operation 302, the jobs manager 150 detects that a first error (e.g., an error 116) associated with processing a first job (e.g., job 162) by a first software application 110 of the plurality of software applications 110 has occurred.

At operation 304, the jobs manager 150 obtains a first error message (e.g., new error message 169) associated with the first error 116.

As described above, jobs manager 150 may be configured to resolve errors 116 associated with processing a job 162 or a batch of jobs 162 by a software application 110. Jobs manager 150 may be configured to monitor processing of jobs 162 by software applications 110 within the computing infrastructure 102. When an error 116 occurs in processing of a job 162 or a batch of jobs 162 associated with a software application 110, the jobs manager 150 obtains a new error message 169 associated with the error 116. For example, when an error 116 occurs during processing of a job 162 or a batch of jobs 162 associated with a software application 110, the software application 110 generally generates a new error message 169 that is indicative of the specific error 116 that has occurred. In some embodiments, the new error message 169 generated by the software application 110 may include a description of the specific error 116 that has occurred. For example, when the error 116 originates from an input system 112 or an output system 114 associated with the software application 110, the new error message 169 may include an identity of the input system 112 or the output system 114 as the case may be and the type of error 116 (e.g., database access error, certificate expired error, login credentials error, loading error etc.) that has occurred.

At operation 306, the jobs manager 150 determines whether the first error message (e.g., new error message 169) is one of the known error messages 164 associated with the first software application.

As described above, once the new error message 169 associated with the error 116 relating to the software application 119 is obtained, jobs manager 150 checks whether the new error message 169 is a known error message 164 associated with the software application 110. For example, the jobs manager 150 accesses the application profile 160 of the software application 110 and compares the new error message 169 to each known error message 164 that is part of the application profile 160. When the new error message 169 matches with a known error message 164 associated with the software application 110, jobs manager 150 determines that the new error message 169 is a known error message 164 associated with the software application 110. This means that the new error message 169 is same as a known error message 164 that was previously recorded relating to the same software application 110. For example, when a database access error occurs while processing a job 162 by the software application 110, the software application 110 may generate a new error message (e.g., db_error) indicating that the database error has occurred. When the same db_error message is stored as a known error message 164 as part of the application profile of the software application 110, jobs manager 150 determines that the new db_error message is same as the known db_error message.

If the first error message (e.g., new error message 169) is determined to be one of the known error messages 164 associated with the first software application 110, method 300 proceeds to operations 308 and 310 where the jobs manager 150 obtains (e.g., from the memory 156) a known recovery plan 166 associated with the known error message 164 and performs the recovery steps 168 included in the known recovery plan 166 to resolve the first error 116 associated with the first software application 110. On the other hand, if the first error message is not one of the known error messages 164, method 300 proceeds to operation 312.

At operation 312, in response to determining that the first error message (e.g., new error message 169) is not one of the known error messages 164, the jobs manager 150 determines a second software application 110 of the plurality of software applications 110 that is associated with a same or similar known error message 164 as the first error message.

As described above, when a new error message 169 does not match with any of the known error messages 164 configured for a software application 110 (e.g., first software application 110) to which the new error message 169 belongs, jobs manager 150 may be configured to determine another software application 110 (hereinafter second software application) that is associated with a same or similar known error message 164 as the new error message 169. For example, jobs manager 150 compares the new error message 169 associated with the first software application 110 with the known error messages 164 associated with a plurality of software applications 110 and tries to find a known error message 164 configured for a second software application 110 that is same as or at least closely matches the new error message 169 associated with the first software application 110. For example, when the new error message 169 associated with the first software application 110 is db_error and a known error message 164 associated with a second software application is an exact match (e.g., also db_error), the jobs manager 150 determines that the second software application 110 is associated with a same known error message 164 as the new error message 169 associated with the first software application 110.

In one or more embodiments, jobs manager 150 may be configured to search for a same or similar known error message 164 associated with a second software application 110 that is associated with similar input systems 112 and output systems 114 as the first software application 110. In other words, jobs manager 150 searches for a second software application 110 that is a close match to the first software application 110 in terms of input systems 112 and/or output systems 114 associated with the two software applications 110. For example, the jobs manager 150 first searches for those software applications 110 that are associated with at least one input system, at least one output system, or a combination thereof that are also associated with the first software application 110. It may be noted that jobs manager 150 may not find a software application 110 that is an exact match to the first software application 110 in terms of the input system 112 and the output systems 114. For example, jobs manager 150 may not find a software application 110 that is associated with all the same input systems 112 and output systems 114 as the first software application 110. In such a case, the jobs manager 150 may be configured to identify a partial match to the first software application 110. For example, jobs manager 150 may find, among a plurality of software applications 110, one or more software applications 110 that are associated with one or more of the same input systems 112 and the output systems 114 as the first software application 110. Thus, the software applications 110 identified by the jobs manager 150 may include one or more software applications that are an exact match to the first software application in terms of input systems 112 and output systems 114. Additionally or alternatively, the software applications 110 identified by the jobs manager 150 may include one or more software applications that are partial matches to the first software application in terms of input systems 112 and output systems 114.

Once one or more software applications 110 are identified that are associated with at least one input system, at least one output system, or a combination thereof that are also associated with the first software application 110, the jobs manager 150 searches for a second software application 110 from the one or more identified software application 110, that is configured with a same or similar known error message 164 as the new error message 169. In other words, the jobs manager 150 searches for a same or similar known error message 164 among the known error messages 164 defined for only those one or more identified software applications 110 that have at least one input/output system also associated with the first software application 110.

At operation 314, the jobs manager 150 obtains from the memory a first known recovery plan 166 associated with the same or similar known error message 164.

At operation 316, the jobs manager 150, generates a customized recovery plan 172 for the first software application 110 based at least in part upon the first known recovery plan 166, wherein the customized recovery plan 172 includes one or more customized recovery steps 174 associated with resolving the first error 116.

As described above, in response to determining a second software application (e.g., from the identified one or more software applications with similar input/output systems as described above) that is associated with a same or similar known error message 164 as the new error message 169, jobs manager 150 may be configured to obtain a known recovery plan 166 associated with the identified same or similar known error message 164. Jobs manager 150 may be configured to generate a customized recovery plan 172 for the new error message 169 associated with the first software application 110, by customizing the known recovery plan 166 associated with the identified same or similar known error message 164 to suit the first software application 110. The customized recovery plan 172 includes one or more customized recovery steps 174 configured to resolve the error 116 associated with the new error message 169. In one embodiment, the customized recovery steps 174 may include one or more customized recovery steps 174 that are configured to be performed in a sequence, one or more customized recovery steps 174 that are configured to be performed in conjunction to each other (e.g., in parallel), or a combination thereof.

In one or more embodiments, to generate the customized recovery plan 172, jobs manager 150 may be configured to customize the known recovery plan 166 associated with the identified same or similar known error message 164 by replacing one or more recovery steps 168 from the known recovery plan 166 with respective one or more customized recovery steps that are specific to input systems 112 and/or output systems associated with the first software application 110. For example, the second software application 110 to which the known recovery plan 166 belongs may be associated with one or more input/output systems that are different from the input/output systems associated with the first software application 110. Accordingly, one or more recovery steps 168 included in the known recovery plan 166 may be directed to specific input and/or output systems associated with the second software application 110 and may not apply to the first software application 110 which may not have the same input and output systems. In such a case, the jobs manager 150 may replace those one or more recovery steps 168 with customized recovery steps 174 that are directed to input and/or output system associated with the first software application 110. In this context, jobs manager 150 first identifies those recovery steps 168 from the known recovery plan 166 that are directed to input and/or output systems not associated with the first software application 110. Then jobs manager 150 identifies (e.g., from the application profile 160 of the first software application 110) those recovery steps 168 that are mapped to input and/or output system that are similar to the respective input and/or output systems to which the identified recovery steps 168 from the known recovery plan 166 are directed to. Jobs manager 150 then replaces each identified recovery step 168 from the known recovery plan 166 with a corresponding recovery step 168 that is mapped to a similar input and/or output system associated with the first software application 110. For example, the first software application 110 may use a JIRA tool as an output system 114, while the second software application 110 may use ServiceNow tool as an output system 114. The known recovery plan 166 associated with the second software application 110 may include "create ServiceNow ticket" and "monitor ServiceNow ticket" as two recovery steps 168. Jobs manager 150 may replace these two recovery steps 168 with "create JIRA ticket" and "monitor JIRA ticket" that are mapped to the first software application 110. Accordingly, the customized recovery steps 174 of the customized recovery plan 172 generated for the first software application 110 may include the two replaced recovery steps 168 and remaining original recovery steps 168 from the known recovery plan 166 associated with the second software application 110.

At operation 318, the jobs manager 150 performs one or more of the customized recovery steps 174 associated with the customized recovery plan 172 to resolve the first error 116 associated with the first software application 110.

Figure 4:
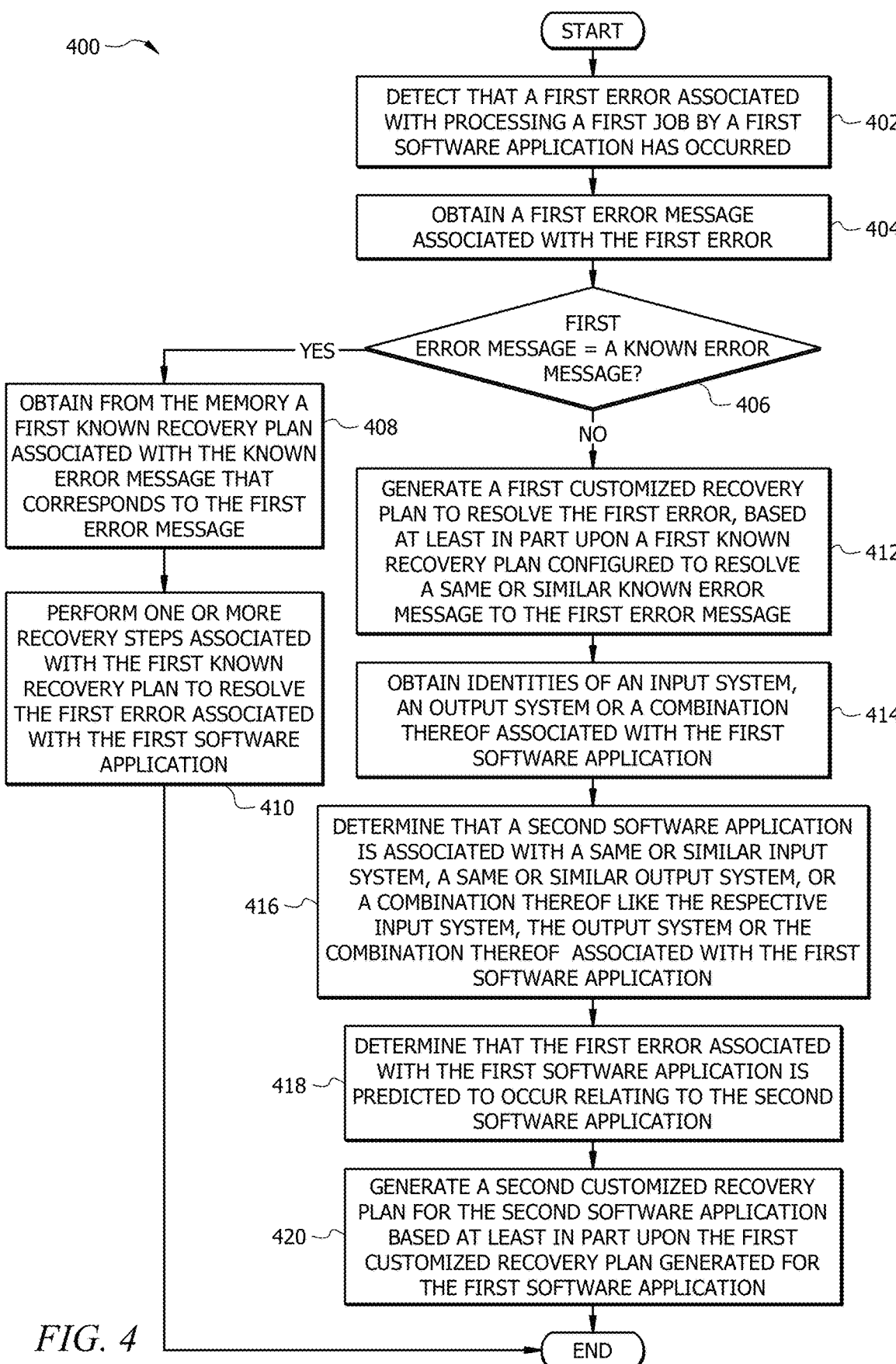
FIG. 4 illustrates a flowchart of an example method for predicting and resolving errors associated with software applications, in accordance with one or more embodiments of the present disclosure.

FIG. 4 illustrates a flowchart of an example method 400 for predicting and resolving errors associated with software applications, in accordance with one or more embodiments of the present disclosure. Method 400 may be performed by the jobs manager 150 shown in FIG. 1.

At operation 402, the jobs manager 150 detects that a first error (e.g., an error 116) associated with processing a first job (e.g., job 162) by a first software application 110 of the plurality of software applications 110 has occurred.

At operation 404, the jobs manager 150 obtains a first error message (e.g., new error message 169) associated with the first error 116.

As described above, jobs manager 150 may be configured to resolve errors 116 associated with processing a job 162 or a batch of jobs 162 by a software application 110. Jobs manager 150 may be configured to monitor processing of jobs 162 by software applications 110 within the computing infrastructure 102. When an error 116 occurs in processing of a job 162 or a batch of jobs 162 associated with a software application 110, the jobs manager 150 obtains a new error message 169 associated with the error 116. For example, when an error 116 occurs during processing of a job 162 or a batch of jobs 162 associated with a software application 110, the software application 110 generally generates a new error message 169 that is indicative of the specific error 116 that has occurred. In some embodiments, the new error message 169 generated by the software application 110 may include a description of the specific error 116 that has occurred. For example, when the error 116 originates from an input system 112 or an output system 114 associated with the software application 110, the new error message 169 may include an identity of the input system 112 or the output system 114 as the case may be and the type of error 116 (e.g., database access error, certificate expired error, login credentials error, loading error etc.) that has occurred.

At operation 406, the jobs manager 150 determines whether the first error message (e.g., new error message 169) is one of the known error messages 164 associated with the first software application.

As described above, once the new error message 169 associated with the error 116 relating to the software application 119 is obtained, jobs manager 150 checks whether the new error message 169 is a known error message 164 associated with the software application 110. For example, the jobs manager 150 accesses the application profile 160 of the software application 110 and compares the new error message 169 to each known error message 164 that is part of the application profile 160. When the new error message 169 matches with a known error message 164 associated with the software application 110, jobs manager 150 determines that the new error message 169 is a known error message 164 associated with the software application 110. This means that the new error message 169 is same as a known error message 164 that was previously recorded relating to the same software application 110. For example, when a database access error occurs while processing a job 162 by the software application 110, the software application 110 may generate a new error message (e.g., db_error) indicating that the database error has occurred. When the same db_error message is stored as a known error message 164 as part of the application profile of the software application 110, jobs manager 150 determines that the new db_error message is same as the known db_error message.

If the first error message (e.g., new error message 169) is determined to be one of the known error messages 164 associated with the first software application 110, method 400 proceeds to operations 408 and 410 where the jobs manager 150 obtains (e.g., from the memory 156) a known recovery plan 166 associated with the known error message 164 and performs the recovery steps 168 included in the known recovery plan 166 to resolve the first error 116 associated with the first software application 110. On the other hand, if the first error message is not one of the known error messages 164, method 400 proceeds to operation 412.

At operation 412, jobs manager 150 generates a first customized recovery plan 172 to resolve the first error 116, based at least in part upon a first known recovery plan 166 configured to resolve a same or similar known error message 164 to the first error message (e.g., new error message 169). Generation of a customized recovery plan 172 is described with reference to FIG. 1 and operations 312-316 of FIG. 3.

At operation 414, jobs manager 150 obtains the identities of an input system 112, an output system 114 or a combination thereof associated with the first software application 110.

As described above, when the jobs manager 150 has generated a customized recovery plan 172 (hereinafter referred to as first customized recovery plan 172) as described above for a first software application 110 to resolve an error 116 associated with a new error message 169, jobs manager 150 may be configured to determine whether the same error 116 may occur when processing one or more jobs 162 associated with other software applications 110. Jobs manager 150 first obtains identities of input system(s) 112 and output system(s) 114 associated with the first software application 110 to which the first customized recovery plan 172 belongs. Jobs manager 150 may obtain the identities of input system(s) 112 and output system(s) 114 associated with the first software application 110 from the application profile 160 associated with the first software application 110.

At operation 416, jobs manager 150 determines that a second software application 110 of the plurality of software applications 110 is associated with a same or similar input system 112, a same or similar output system 114, or a combination thereof like the respective input system 112, the output system 112 or the combination thereof associated with the first software application 110.

As described above, based on the application profiles 160 of a plurality of other software applications 110, jobs manager 150 may be configured to search for those software applications 110 that are associated with at least one input system, at least one output system, or a combination thereof that are also associated with the first software application 110. For example, based on searching the application profiles 160 of a plurality of other software applications 110, the jobs manager 150 may identify another software application 110 (e.g., a second software application 110) that is associated with at least one input system, at least one output system, or a combination thereof that are also associated with the first software application 110. Essentially, the jobs manager 150 may be configured to identify a partial match to the first software application 110. For example, jobs manager 150 may find, among the plurality of software applications 110, one or more software applications 110 that are associated with one or more of the same input systems 112 and the output systems 114 as the first software application 110.

At operation 418, in response to determining that the second software application 110 is associated with the same or similar input system 112, the same or similar output system 114, or the combination thereof, jobs manager 150 determines that the first error 116 associated with the first software application 110 is predicted to occur relating to the second software application 110.

As described above, in response to determining a third software application 110 that is associated with at least one input system, at least one output system, or a combination thereof that are also associated with the first software application 110, jobs manager 150 may be configured to determine that the error 116 associated with the first software application 110 (e.g., associated with the new error message 169) may also occur in relation to the second software application 110. In other words, jobs manager 150 predicts that the error 116 that was detected in relation to the first software application may also occur in relation to the second software application 110 as the first software application 110 and the second software application 110 are at least a partial match with regard to input and output systems associated with the two software applications.

At operation 420, in response to determining that the first error 116 associated with the first software application 110 is predicted to occur relating to the second software application 110, jobs manager 150 generates a second customized recovery plan 172 for the second software application 110 based at least in part upon the first customized recovery plan 172 generated for the first software application 110, wherein the second customized recovery plan 172 comprises a plurality of customized recovery steps 174 to resolve the first error 116 predicted for the second software application 110.

As described above, once the jobs manager 150 determines that the first error 116 detected in relation to the first software application 110 is predicted to occur in relation to the second software application 110, jobs manager 150 may be configured to generate a customized recovery plan 172 (e.g., a second customized recovery plan 172) for resolving the predicted error 116 whenever the error 116 subsequently occurs in relation to the second software application 110, wherein the second customized recovery plan 172 includes one or more customized recovery steps 174 that may be performed to resolve the error 116 relating to the second software application.

Jobs manager 150 may be configured to store as part of the application profile of the second software application, the new error message 169 detected in relation to the first software application and the second customized recovery plan 172 as a known error message 164 and known recovery plan 166 respectively. In one or more embodiments, in response to detecting that the error 116 has occurred in relation to the second software application 110 and that the known error message 164 (which is same as the new error message associated with the first software application 110) has been generated, the jobs manager 150 performs one or more the recovery steps 168 from the known recovery plan 166 (which are same as the customized recovery steps of the second customized recovery plan 172) associated with the known error message to resolve the error 116.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a memory that stores for each software application of a plurality of software applications:
a list of known error messages relating to processing jobs associated with that software application of the plurality of software applications; and
a known recovery plan associated with each known error message of the known error messages, wherein the known recovery plan associated with that known error message of the known error messages comprises one or more recovery steps that are to be processed to resolve an error associated with that known error message; and
a processor communicatively coupled to the memory and configured to:
detect that a first error associated with processing a first job by a first software application of the plurality of software applications has occurred;
obtain a first error message associated with the first error;
determine whether the first error message is one of the known error messages associated with the first software application;
in response to determining that the first error message is not one of the known error messages:

determine a second software application of the plurality of software applications that is associated with a same known error message as the first error message;
obtain from the memory a first known recovery plan associated with the same known error message;
generate a customized recovery plan for the first software application based at least in part upon the first known recovery plan, wherein the customized recovery plan comprises one or more customized recovery steps associated with resolving the first error; and
perform one or more of the customized recovery steps associated with the customized recovery plan to resolve the first error associated with the first software application, wherein the customized recovery steps comprise at least one of retry the first job after a pre-configured time interval, clear memory, re-launch the first software application, update the first software application, or re-start a computing node that hosts the first software application.

2. The system of claim 1, wherein the memory further stores:
for each software application of a first subset of the plurality of software applications:
identities of one or more input systems that provide data to that software application of the first subset, identities of one or more output systems that receive data from that software application of the first subset, or a combination thereof; and
a plurality of recovery steps associated with resolving known errors relating to the one or more input systems, the one or more output systems, or the combination thereof.

3. The system of claim 2, wherein the processor is further configured to determine the second software application that is associated with the same known error message as the first error message by:
determining one or more software applications of the plurality of software applications that are associated with at least one input system, at least one output system, or a combination thereof that are also associated with the first software application; and
determining, from the one or more software applications, the second software application of the plurality of software applications that is associated with the same known error message as the first error message.

4. The system of claim 3, wherein the processor is further configured to generate the customized recovery plan by:
obtaining the plurality of recovery steps associated with resolving known errors relating to one or more input systems, one or more output systems, or a combination thereof associated with the first software application; and
generating the customized recovery plan for the first software application by replacing at least one recovery step from the first known recovery plan with a corresponding recovery step associated with the first software application.

5. The system of claim 4, wherein the processor is further configured to:
input, into a machine learning (ML) model, at least the first known recovery plan and the plurality of recovery steps associated with the first software application, wherein the ML model is trained to generate customized recovery plans for resolving errors associated with the software applications; and generate the customized recovery plan for the first software application using the ML model.

6. The system of claim 5, wherein the processor is further configured to:

transmit the customized recovery plan to a reviewer computing node;

receive feedback from the reviewer computing node relating to the customized recovery plan, wherein the feedback at least comprises changes to one or more of the customized recovery steps associated with the customized recovery plan; and retrain the ML model using the feedback.

7. The system of claim 6, wherein the processor is further configured to:

generate an updated customized recovery plan based on the feedback received from the reviewer computing node; and perform one or more customized recovery steps associated with the updated customized recovery plan to resolve the first error associated with the first software application.

8. The system of claim 1, wherein the processor is further configured to determine the same known error message as the first error message by:

comparing the first error message to the known error messages associated with one or more software applications of the plurality of software applications; and selecting a particular known error message that has at least a portion of a content of the particular known error message matching with a corresponding content of the first error message, wherein the selected particular known error message is the same known error message as the first error message.

9. The system of claim 1, wherein the first job is part of a batch of jobs to be processed by the first software application.

10. A method for resolving errors, the method comprising:

detecting that a first error associated with processing a first job by a first software application of a plurality of software applications has occurred;

obtaining a first error message associated with the first error;

determining whether the first error message is one of known error messages associated with the first software application, wherein a memory stores for each software application of the plurality of software applications:

a list of known error messages relating to processing jobs associated with that software application of the plurality of software applications; and a known recovery plan associated with each known error message of the known error messages, wherein the known recovery plan associated with that known error message of the known error messages comprises one or more recovery steps that are to be processed to resolve an error associated with that known error message;

in response to determining that the first error message is not one of the known error messages:

determining a second software application of the plurality of software applications that is associated with a same known error message as the first error message;

obtaining from the memory a first known recovery plan associated with the same known error message;

generating a customized recovery plan for the first software application based at least in part upon the first known recovery plan, wherein the customized recovery plan comprises one or more customized recovery steps associated with resolving the first error; and performing one or more of the customized recovery steps associated with the customized recovery plan to resolve the first error associated with the first software application, wherein the customized recovery steps comprise at least one of retry the first job after a pre-configured time interval, clear memory, re-launch the first software application, update the first software application, or re-start a computing node that hosts the first software application.

11. The method of claim 10, wherein the memory further stores:

for each software application of a first subset of the plurality of software applications:

identities of one or more input systems that provide data to that software application of the first subset, identities of one or more output systems that receive data from that software application of the first subset, or a combination thereof; and a plurality of recovery steps associated with resolving known errors relating to the one or more input systems, the one or more output systems, or the combination thereof.

12. The method of claim 11, wherein determining the second software application that is associated with the same known error message as the first error message comprises:

determining one or more software applications of the plurality of software applications that are associated with at least one input system, at least one output system, or a combination thereof that are also associated with the first software application; and determining, from the one or more software applications, the second software application of the plurality of software applications that is associated with the same known error message as the first error message.

13. The method of claim 12, wherein generating the customized recovery plan comprises:

obtaining the plurality of recovery steps associated with resolving known errors relating to one or more input systems, one or more output systems, or a combination thereof associated with the first software application; and generating the customized recovery plan for the first software application by replacing at least one recovery step from the first known recovery plan with a corresponding recovery step associated with the first software application.

14. The method of claim 13, further comprising:

inputting, into a machine learning (ML) model, at least the first known recovery plan and the plurality of recovery steps associated with the first software application, wherein the ML model is trained to generate customized recovery plans for resolving errors associated with the software applications; and generating the customized recovery plan for the first software application using the ML model.

15. The method of claim 14, further comprising:

transmitting the customized recovery plan to a reviewer computing node;

receiving feedback from the reviewer computing node relating to the customized recovery plan, wherein the feedback at least comprises changes to one or more of the customized recovery steps associated with the customized recovery plan; and retraining the ML model using the feedback.

16. The method of claim 15, further comprising:

generating an updated customized recovery plan based on the feedback received from the reviewer computing node; and performing one or more customized recovery steps associated with the updated customized recovery plan to resolve the first error associated with the first software application.

17. The method of claim 10, wherein determining the same known error message as the first error message comprises:

comparing the first error message to the known error messages associated with one or more software applications of the plurality of software applications; and selecting a particular known error message that has at least a portion of a content of the particular known error message matching with a corresponding content of the first error message, wherein the selected particular known error message is the same known error message as the first error message.

18. A non-transitory computer-readable medium storing instructions that when executed by a processor cause the processor to:

detect that a first error associated with processing a first job by a first software application of a plurality of software applications has occurred;

obtain a first error message associated with the first error;

determine whether the first error message is one of known error messages associated with the first software application, wherein a memory stores for each software application of the plurality of software applications:

a list of known error messages relating to processing jobs associated with that software application of the plurality of software applications; and a known recovery plan associated with each known error message of the known error messages, wherein the known recovery plan associated with that known error message of the known error messages comprises one or more recovery steps that are to be processed to resolve an error associated with that known error message;

in response to determining that the first error message is not one of the known error messages:

determine a second software application of the plurality of software applications that is associated with a same known error message as the first error message;

obtain from the memory a first known recovery plan associated with the same known error message;

generate a customized recovery plan for the first software application based at least in part upon the first known recovery plan, wherein the customized recovery plan comprises one or more customized recovery steps associated with resolving the first error; and perform one or more of the customized recovery steps associated with the customized recovery plan to resolve the first error associated with the first software application, wherein the customized recovery steps comprise at least one of retry the first job after a pre-configured time interval, clear memory, re-launch the first software application, update the first software application, or re-start a computing node that hosts the first software application.

19. The non-transitory computer-readable medium of claim 18, wherein the memory further stores:

for each software application of a first subset of the plurality of software applications:

identities of one or more input systems that provide data to that software application of the first subset, identities of one or more output systems that receive data from that software application of the first subset, or a combination thereof; and a plurality of recovery steps associated with resolving known errors relating to the one or more input systems, the one or more output systems, or the combination thereof.

20. The non-transitory computer-readable medium of claim 19, wherein determining the second software application that is associated with the same known error message as the first error message comprises:

determining one or more software applications of the plurality of software applications that are associated with at least one input system, at least one output system, or a combination thereof that are also associated with the first software application; and determining, from the one or more software applications, the second software application of the plurality of software applications that is associated with the same known error message as the first error message.

* * * * *